(12) United States Patent
Wurth

(10) Patent No.: US 11,220,991 B2
(45) Date of Patent: Jan. 11, 2022

(54) MULTI-INDUSTRY JUMP STARTING SYSTEM

(71) Applicant: James Wurth, Las Vegas, NV (US)

(72) Inventor: James Wurth, Las Vegas, NV (US)

( * ) Notice: Subject to any disclaimer, the term of this patent is extended or adjusted under 35 U.S.C. 154(b) by 634 days.

(21) Appl. No.: 16/130,784

(22) Filed: Sep. 13, 2018

(65) Prior Publication Data

US 2019/0078546 A1 Mar. 14, 2019

Related U.S. Application Data

(60) Provisional application No. 62/558,542, filed on Sep. 14, 2017.

(51) Int. Cl.
*F02N 11/14* (2006.01)
*F02N 11/08* (2006.01)
*F02N 11/12* (2006.01)
*H02J 7/34* (2006.01)
*H01M 10/052* (2010.01)
*H02J 7/00* (2006.01)
*H02J 1/00* (2006.01)
*H02J 1/10* (2006.01)

(52) U.S. Cl.
CPC .......... *F02N 11/14* (2013.01); *F02N 11/0862* (2013.01); *F02N 11/12* (2013.01); *H02J 7/342* (2020.01); *F02N 2011/0885* (2013.01); *H01M 10/052* (2013.01); *H01M 2220/30* (2013.01); *H02J 1/00* (2013.01); *H02J 1/122* (2020.01); *H02J 7/0044* (2013.01)

(58) Field of Classification Search
CPC ...... F02N 11/14; F02N 11/12; F02N 11/0862; H02J 1/122; H02J 7/342
See application file for complete search history.

(56) References Cited

U.S. PATENT DOCUMENTS

| | | | | |
|---|---|---|---|---|
| 6,160,373 A | * | 12/2000 | Dunn | ...... H02J 7/342 320/105 |
| 2009/0174362 A1 | * | 7/2009 | Richardson | ...... F02N 11/14 320/105 |

OTHER PUBLICATIONS

SupplyNet. "NATO Plug with Cable." Supplynet, Inc., Aug. 10, 2016. https://web.archive.org/web/20160810060607/https://www.tacticaleng.com/nato-plug-with-cable. (Year: 2016).*

* cited by examiner

*Primary Examiner* — David V Henze-Gongola
(74) *Attorney, Agent, or Firm* — Parsons & Goltry; Robert Parsons; Michael Goltry

(57) ABSTRACT

A portable multi-industry jump starting system including a housing, a rechargeable battery enclosed within the housing, the rechargeable battery having sufficient power to provide a desired output power when reduced by a high current drain during jump starting operations, a multi-pin connector electrically attached to the battery and mounted in the housing for electrical connection to external system components or directly to equipment to be jump started, and a volt meter and volt meter activation switch mounted in the housing so as to be viewable at the multi-pin connector.

6 Claims, 5 Drawing Sheets

MULTI-INDUSTRY JUMP STARTING SYSTEM

CROSS-REFERENCE TO RELATED APPLICATION

This application claims the benefit of U.S. Provisional Patent Application No. 62/558,542, filed 14 Sep. 2017.

FIELD OF THE INVENTION

This invention relates to a portable battery jump starting system that can be used in a variety of different situations and industries.

BACKGROUND OF THE INVENTION

In various industries and businesses, a jump starting system that is convenient, inexpensive, easy to handle and use is highly desirable. As a typical example of the prior art, jump starting battery units for airplanes plug directly into the external power plug of the airplane and simply hang from the airplane plug. This is dangerous and extremely hard or stressful on the external plug of the airplane. Also, in many instances the prior art jump starting battery units are designed to operate with a single type of airplane or other vehicle. This results in requiring different pieces of equipment for each different vehicle being jump started.

It would be highly advantageous, therefore, to remedy this and other deficiencies inherent in the prior art.

Accordingly, it is an object of the present invention to provide a new and improved portable multi-industry jump starting system.

It is another object of the present invention to provide a new and improved portable multi-industry jump starting system that is inexpensive and easy to use.

It is another object of the present invention to provide a new and improved portable multi-industry jump starting system that can be used in a variety of industries and for a variety of different vehicles.

SUMMARY OF THE INVENTION

Briefly, to achieve the desired objects of the instant invention in accordance with a preferred embodiment thereof, a portable multi-industry jump starting system is provided that includes a housing, a rechargeable battery enclosed within the housing, the rechargeable battery having sufficient power to provide a desired output power when reduced by a high current drain during jump starting operations. A multi-pin connector is electrically attached to the battery and mounted in the housing for electrical connection to external system components or directly to equipment to be jump started. A battery charger can be provided to charge the battery. The battery charger is electrically attachable to the battery and includes a connector attachable to an external source of charging power. A volt meter and volt meter activation switch are mounted in the housing so as to be viewable at the multi-pin connector.

The desired objects of the instant invention are further realized in accordance with a specific embodiment of a portable multi-industry jump starting system including a housing, a 28 volt rechargeable battery enclosed within the housing, the rechargeable battery having sufficient power to provide 24 volts when reduced by a high current drain during jump starting operations, and a 3-pin connector electrically attached to the battery and mounted in the housing for electrical connection directly to equipment to be jump started or to external system components including one of a 3-pin aircraft cable extension assembly and a NATO truck plug adapter. A battery charger can be provided to charge the battery. The battery charger is electrically attachable to the battery and includes a connector attachable to an external source of charging power. A volt meter and volt meter activation switch are mounted in the housing so as to be viewable at the 3-pin connector.

In another aspect of the present invention, a method of jump starting various aircraft or ground vehicles includes a step of providing a portable multi-industry jump starting system including: a housing; a 28 volt rechargeable battery enclosed within the housing, the rechargeable battery having sufficient power to provide 24 volts when reduced by a high current drain during jump starting operations; a 3-pin connector electrically attached to the battery and mounted in the housing for electrical connection directly to equipment to be jump started or to external system components including one of a 3-pin aircraft cable extension assembly and a NATO truck plug adapter; a battery charger provided to charge the battery, the battery charger being electrically attachable to the battery and includes a connector attachable to an external source of charging power; and a volt meter and volt meter activation switch mounted in the housing so as to be viewable at the 3-pin connector. The method further includes the steps of electrically connecting the 3-pin connector of the portable multi-industry jump starting system directly to equipment to be jump started or to the equipment to be jump started through external system components, and operating the volt meter activation switch and observing the reading on the volt meter to determine that sufficient voltage is available and being applied.

BRIEF DESCRIPTION OF THE DRAWINGS

Specific objects and advantages of the invention will become readily apparent to those skilled in the art from the following detailed description of a preferred embodiment thereof, taken in conjunction with the drawings in which.

DETAILED DESCRIPTION OF THE DRAWINGS

Figure 1:
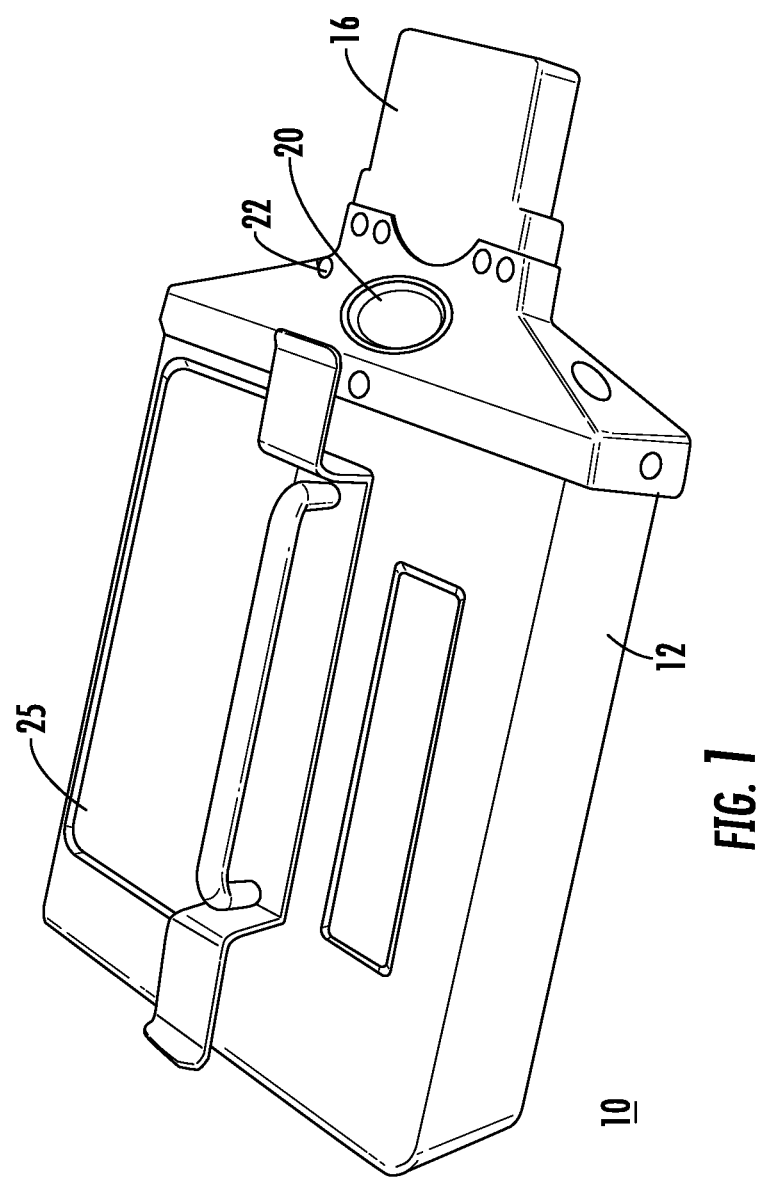
FIG. 1 is a top perspective view of a portable multi-industry jump starting system, in accordance with the present invention.
Figure 2:
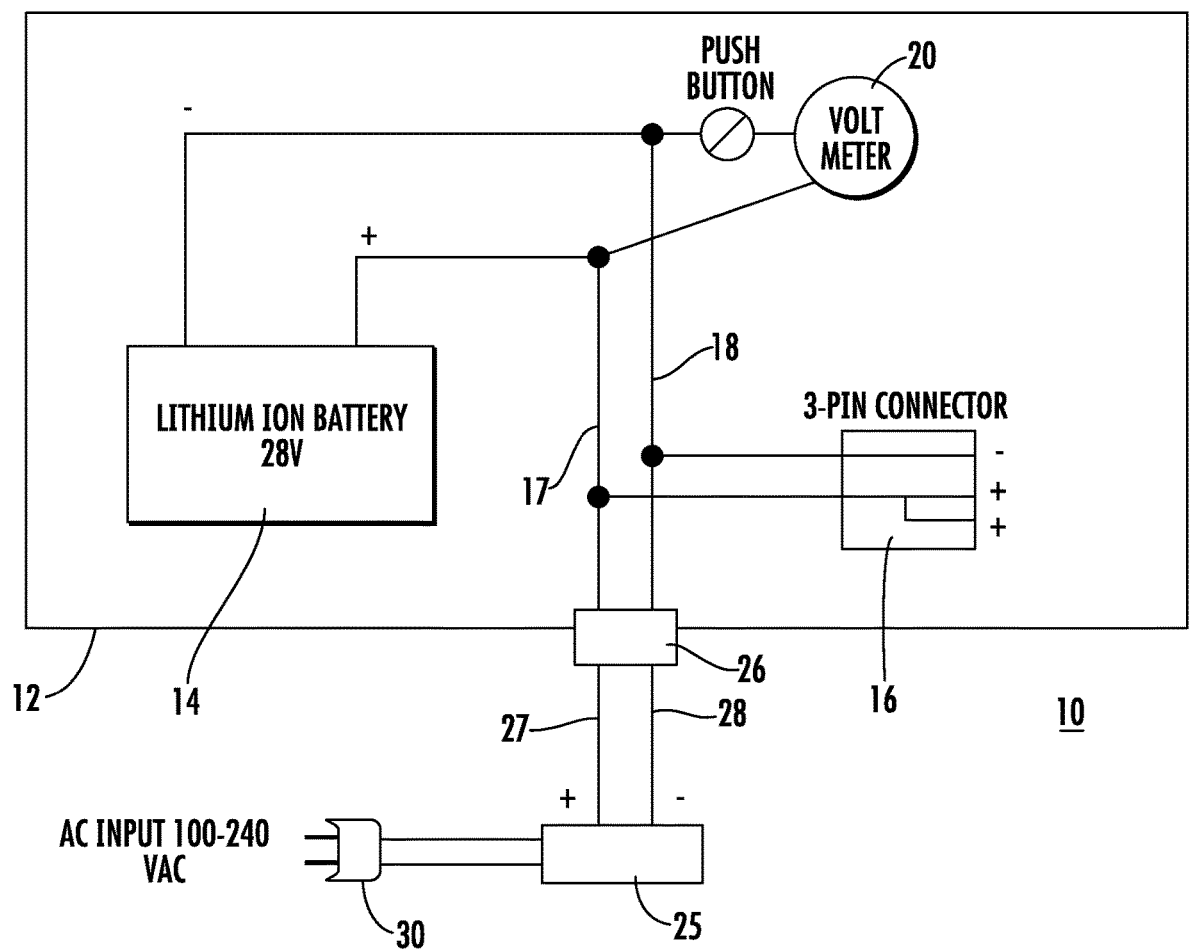
FIG. 2 is a circuit diagram of the portable multi-industry jump starting system illustrated in FIG. 1.

Turning to the drawings and specifically to FIGS. 1 and 2, a portable multi-industry jump starting system 10 is illustrated. System 10 includes a housing 12 enclosing a 28 volt lithium ion battery 14 and having an externally accessible 3-pin connector 16 at one end. Lithium ion battery 14 is connected directly to two of the pins of 3-pin connector 16 by a positive lead 17 and a negative lead 18. A third pin of 3-pin connector 16 is also connected to positive lead 17 and, as understood in the art, is provided to ensure proper connection of any external components. Positive lead 17 is also connected to one terminal of a volt meter 20 and lead 18 is coupled through a volt meter push-button switch 22 to a second terminal of volt meter 20. Volt meter 20 is mounted in housing 12 adjacent to 3-pin connector 16 so as to be easily viewable to determine that proper voltage is being applied to 3-pin connector 16. Simply by depressing push-button 22, which activates the volt meter and which is positioned in housing 12 adjacent volt meter 20, a reading is displayed. While battery 14 is illustrated as a 28 volt lithium ion battery, it will be understood that this simply provides sufficient power to 24 volt systems because the voltage will be reduced by the high current drain during starting operations.

In this specific example, a battery charger 25 is provided to charge the battery. The battery charger is electrically attachable to the battery and includes a connector attachable to an external source of charging power. Battery charger 25 is connected to an externally available connector 26 in housing 12 by a positive lead 27 and a negative lead 28. Positive lead 27 and negative lead 28 are connected through connector 26 to positive lead 17 and negative lead 18 in housing 12, respectively. It will be understood that battery charger 25 can be permanently attached (or a permanent component of housing 12) through connector 26 or detachable, if desired. Battery charger 25 has a common plug 30 for connection to an alternating current 100 to 240 VAC source to provide the recharging power for battery 14. As understood by those of skill in the art, battery charger 25 converts the AC power to DC power for the proper charging of battery 14.

Figure 3:
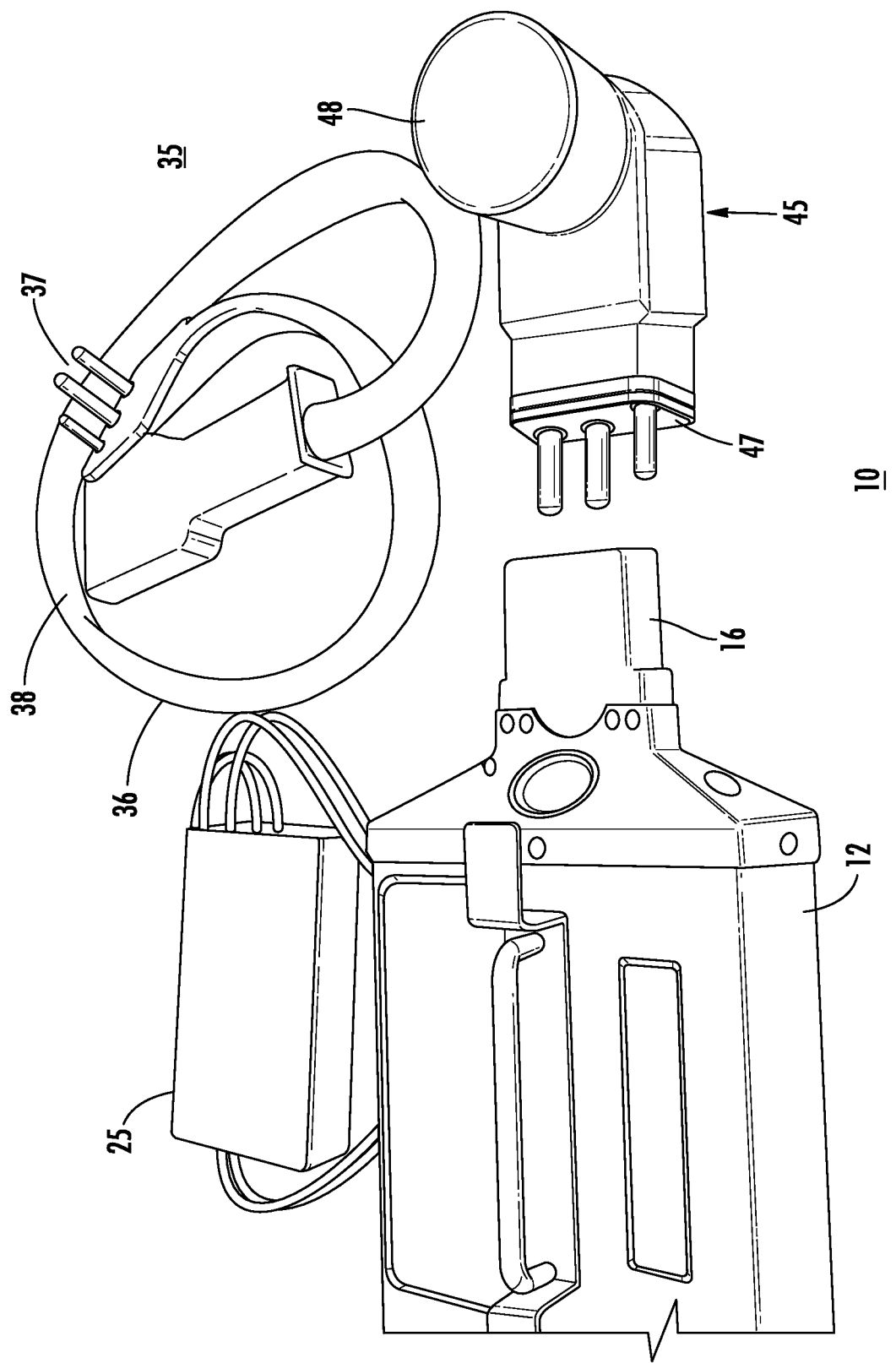
FIG. 3 is top perspective view of the portable multi-industry jump starting system illustrating various components that cooperate to form the system.

Referring additionally to FIG. 3, several additional components of system 12 are illustrated to provide an understanding of the operation and use of system 10. In this view, battery charger 25 is illustrated as a separate unit and further illustrating common plug 30 and the power attachment line. Also illustrated is a 3-pin aircraft cable extension assembly 35, including an elongated cable 36 having a 3-pin plug 37 at one end designed to plug into 3-pin connector 16 in housing 12 and an airplane attachment plug 38 at the other end.

Figure 4:
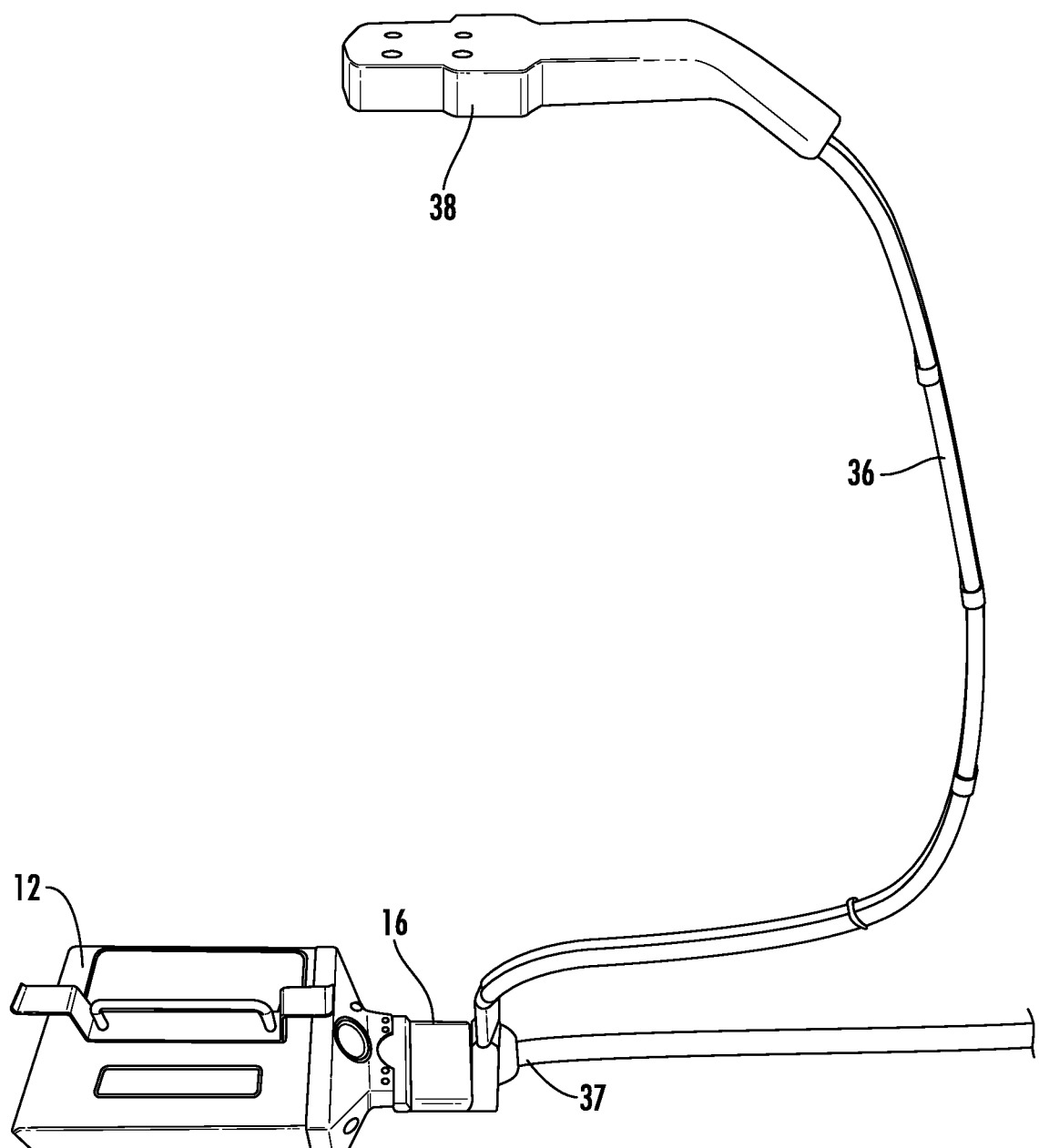
FIG. 4 is a perspective view of the portable multi-industry jump starting system with the 3-pin aircraft cable extension deployed.

Referring additionally to FIG. 4, 3-pin aircraft cable extension assembly 35 is illustrated in a connected or deployed orientation. As can be seen in this view, 3-pin plug 37 is engaged in 3-pin connector 16 to provide starting voltage at the extended airplane attachment plug 38. Thus, instead of simply attaching 3-pin connector 16 directly to an airplane external electrical connector and allowing housing 12 to hang dangerously and stressfully from the airplane external connector, housing 12 can be placed on a table or other platform and airplane attachment plug 38 is extended to connect to the airplane. Substantially all the weight and stress are thus removed from the airplane connector which greatly extends the life of all components concerned.

Figure 5:
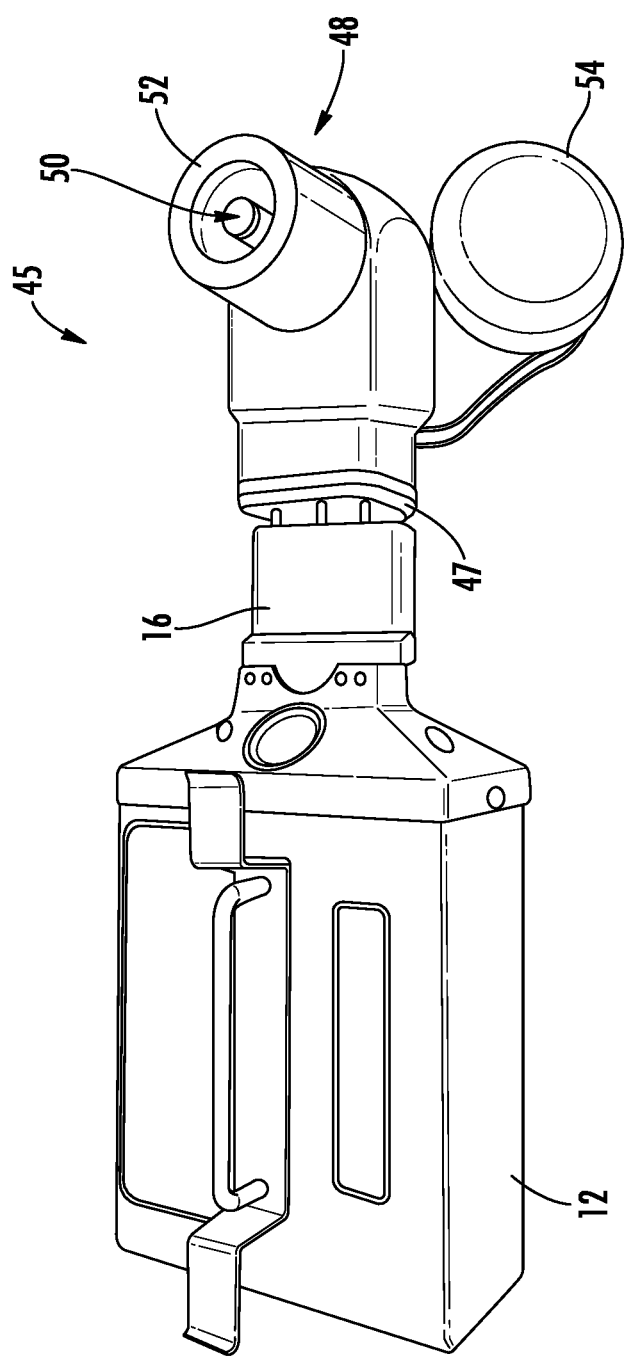
FIG. 5 is a perspective view of the portable multi-industry jump starting system with the NATO truck plug adaptor in a usable orientation.

Referring back to FIG. 3, a NATO truck plug adapter 45 is also illustrated as a component of system 10. Adapter 45 includes a 3-pin plug 47 designed to be engaged directly into 3-pin connector 16 of housing 12, as illustrated in FIG. 5. Adapter 45 has an electrical connector 48 extending at 90 degrees to the body so as to connect directly to an electrical input for jump starting trucks and other vehicles. Electrical connector 48 has a hot or positive center contact 50 and a negative outer ring 52 with a removable cap 54, shown in-place in FIG. 3 and removed in FIG. 5. It will of course be understood that 3-pin aircraft cable extension assembly 35 could be connected between connector 16 of housing 12 and NATO truck plug adapter 45, if desired, to make NATO truck plug adapter 45 even more accessible and easy to use.

In a typical method of operation for a process of jump starting various aircraft or ground vehicles in accordance with the present invention, the following steps are generally observed. The portable multi-industry jump starting system described above is of course provided. The portable system is carried to the particular vehicle to be jump started and the multi-pin connector is electrically attached to the electrical system of the vehicle. Push-button 22 can be depressed to provide a reading on volt meter 20 and the reading on volt meter 20 is observed to determine that sufficient voltage is available and being applied. Once the vehicle is started, the multi-pin connector is disconnected and the portable multi-industry jump starting system is returned to a designated storage area where the battery charger is electrically coupled to the battery and an externally accessible connector of the battery charger is attached to an external source of charging power so the system will be ready for the next use. The multi-pin connector is electrically attached to the electrical system of aircraft by connecting the 3-pin aircraft cable extension assembly between the 3-pin connector in the housing and the electrical system of the aircraft to be started. Similarly, the 3-pin connector in the housing is connected to the electrical system of a NATO truck or other ground vehicle by using the NATO truck plug adapter.

Thus, multi-industry jump starting system 10 is a unit that is designed to be used across various industries that require a cost effective portable and safe jump starting solution when aircraft or ground vehicle batteries fail or when operators simply want to reduce stress on internal batteries. The present lightweight system is unique in that it addresses the requirements across most civil, commercial and military markets. The multi-industry jump starting system can be used for helicopters, fixed wing aircraft, 24V buses, 24V trucks, 24V military tanks, 24V heavy equipment in the mining and construction industries as well as military and civilian UAVs.

Operators using the multi-industry jump starting system are able to reduce their equipment cost by using one piece of equipment for various aircraft or ground vehicles. This is very important with regards to global military operations where lightweight portable reliable solutions are so vital to mission success yet can be challenging given the always present government budget parameters.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A portable multi-industry jump starting system comprising:
   a housing;
   a rechargeable battery enclosed within the housing, the rechargeable battery having sufficient power to provide a desired output power when reduced by a high current drain during jump starting operations;
   a 3-pin connector electrically attached to the battery and mounted in the housing for electrical connection to external system components or directly to equipment to be jump started;
   a volt meter and volt meter activation switch mounted in the housing so the measured output power at the 3-pin connector is viewable; and external system components including a 3-pin aircraft cable extension assembly and a NATO truck plug adapter, each couplable to the 3-pin connector, the NATO truck plug adapter includes an adapter housing mounting a 3-pin plug designed to be engaged directly into the 3-pin connector in the housing and includes a connector with a hot or positive center contact and a negative outer ring with a removable cap, the hot or positive center contact extending at 90 degrees to the adapter housing so as to connect directly to an electrical input for jump starting trucks and other ground vehicles.

2. A portable multi-industry jump starting system as claimed in claim 1 wherein the rechargeable battery is a 28 volt lithium ion battery.

3. A portable multi-industry jump starting system as claimed in claim 1 wherein the jump starting system is a 24 volt system.

4. A portable multi-industry jump starting system as claimed in claim 1 wherein the 3-pin aircraft cable extension assembly includes an elongated cable having a 3-pin plug at one end designed to plug into the 3-pin connector in the housing and an airplane attachment plug at the other end.

5. A portable multi-industry jump starting system comprising:
- a housing;
- a 28 volt rechargeable lithium ion battery enclosed within the housing, the rechargeable battery having sufficient power to provide 24 volts when reduced by a high current drain during jump starting operations;
- a 3-pin connector electrically attached to the battery and mounted in the housing for electrical connection directly to equipment to be jump started or to external system components including one of a 3-pin aircraft cable extension assembly and a NATO truck plug adapter, the NATO truck plug adapter includes an adapter housing mounting a 3-pin plug designed to be engaged directly into the 3-pin connector in the housing and includes a connector with a hot or positive center contact and a negative outer ring with a removable cap, the hot or positive center contact extending at 90 degrees to the adapter housing so as to connect directly to an electrical input for jump starting trucks and other ground vehicles; and
- a volt meter and volt meter activation switch mounted in the housing so the measured output power at the 3-pin connector is viewable.

6. A portable multi-industry jump starting system as claimed in claim 5 wherein the external system components include a 3-pin aircraft cable extension assembly which includes an elongated cable having a 3-pin plug at one end designed to plug into the 3-pin connector in the housing and an airplane attachment plug at the other end.

\* \* \* \* \*